Oct. 20, 1925.

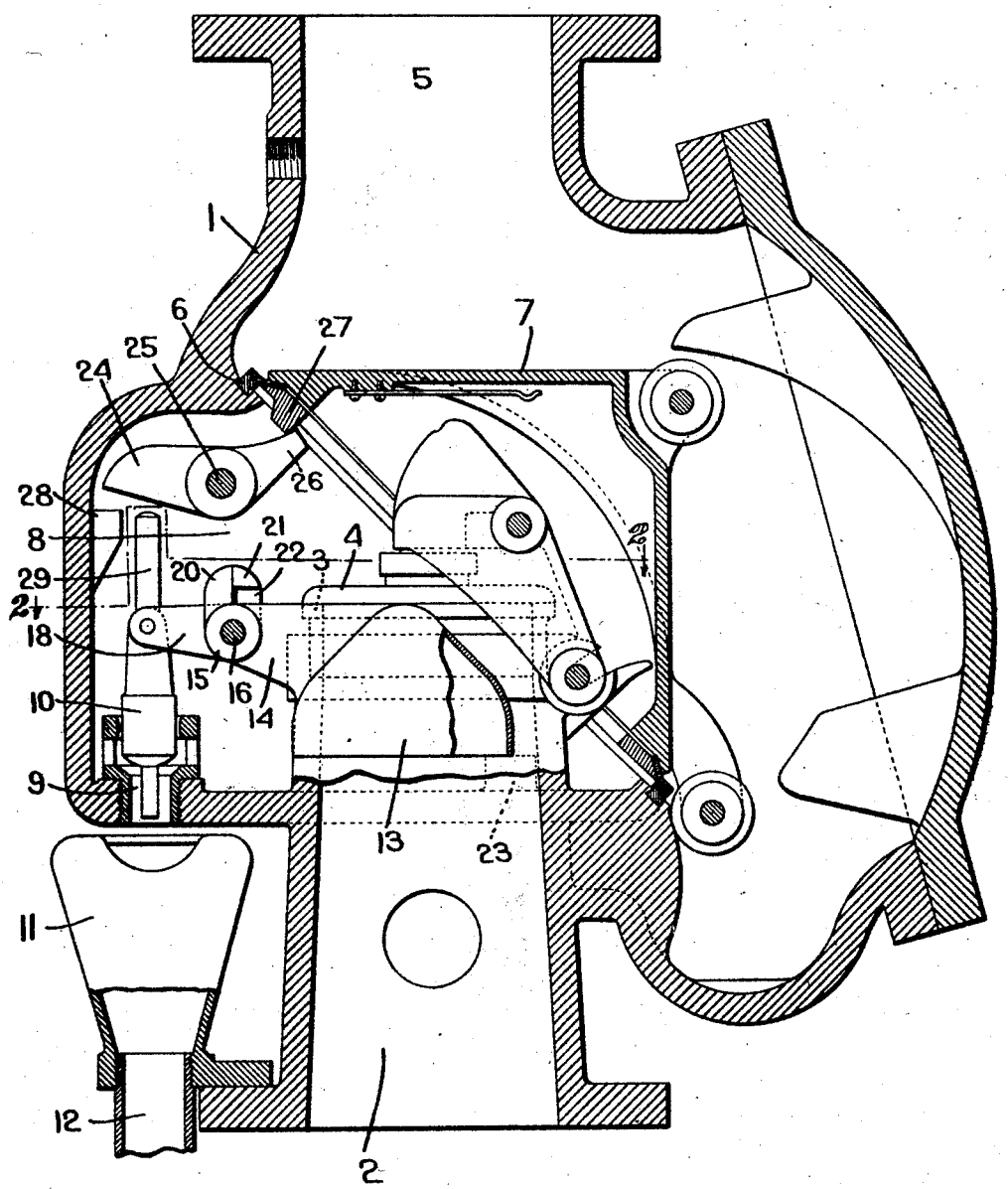

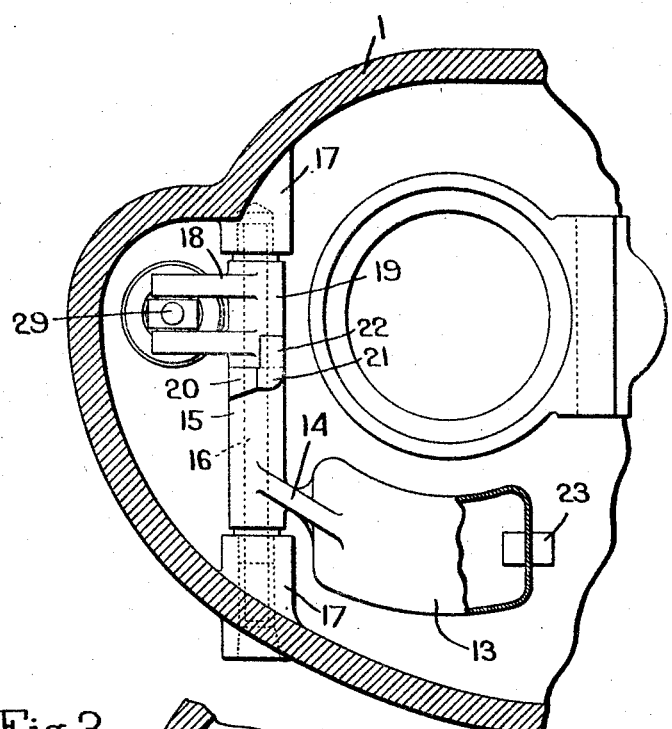
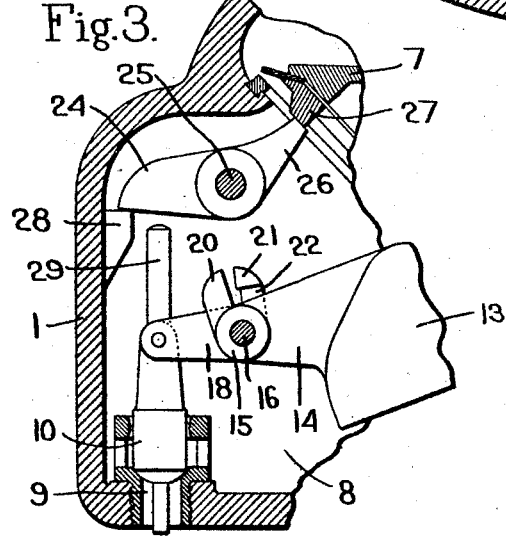

E. E. CLARK 1,557,559

DRIP VALVE FOR DRY PIPE VALVES

Filed Aug. 23, 1922   3 Sheets-Sheet 3

Inventor.
Ezra E. Clark
by Heard Smith & Tennant
Attys.

Patented Oct. 20, 1925.

1,557,559

UNITED STATES PATENT OFFICE.

EZRA E. CLARK, OF NEWTONVILLE, MASSACHUSETTS, ASSIGNOR TO FRANK J. FEE, OF NEW YORK, N. Y.

DRIP VALVE FOR DRY-PIPE VALVES.

Application filed August 23, 1922. Serial No. 583,765.

*To all whom it may concern:*

Be it known that I, EZRA E. CLARK, a citizen of the United States, residing at Newtonville, county of Middlesex, State of Massachusetts, have invented an Improvement in Drip Valves for Dry-Pipe Valves, of which the following description, in connection with the accompanying drawing, is a specification, like characters on the drawing representing like parts.

This invention relates to dry pipe valves such as are used in sprinkler systems, and it has for one of its objects to provide a novel means for controlling the drip valve leading from the neutral or intermediate chamber. For this purpose a buoyant member is provided which is situated within the neutral chamber and which is operatively connected to the drip valve, the construction being such that normally the weight of the buoyant member maintains the drip valve open but if water accumulates in the neutral chamber due to an opening of the water valve, then the buoyant member becomes buoyed up by the water and ceases to function as a means for holding the drip valve open and the latter is either allowed to close, or is positively closed by the buoyant member. It is the present common practise to provide means whereby the drip valve is held open by the air valve when the latter is seated, said drip valve closing only after the air valve has been unseated. With this arrangement when the water begins to flow into the neutral chamber the drip valve will be held open so that water will be flowing freely out of it until sufficient pressure has been built up in said neutral chamber to secure the unseating of the air valve.

With my present invention the closing of the drip valve is not dependent upon the opening of the air valve but is dependant simply upon an accumulation of water in the neutral chamber sufficient to raise the buoyant member and an advantage resulting from the present construction is that the drip valve will close before the air valve is opened, and as soon as the drip valve does close the pressure will quickly build up in the neutral chamber because no water can flow therefrom, thus producng a quicker opening of the air valve.

In a dry pipe valve it is common to provide a latch which operates to prevent the air valve from re-seating after it has been lifted from its seat. In the present construction this latch is entirely independent and separate from the drip valve but the latter has means associated therewith by which the latch may be reset or thrown into its ready-to-operate position.

Other features of my invention relate to various improvements in dry pipe valves all as will be more fully hereinafter set forth.

In order to give an understanding of the invention I have illustrated in the drawings some selected embodiments thereof which will now be described after which the novel features will be pointed out in the appended claims.

Fig. 1 is a vertical sectional of dry pipe valve embodying my invention.

Fig. 2 is a partial section on the line 2—2 Fig. 1, the air and water valve structure being removed.

Fig. 3 is a fragmentary sectional view showing the position of the parts with the drip valve closed.

Figure 4:
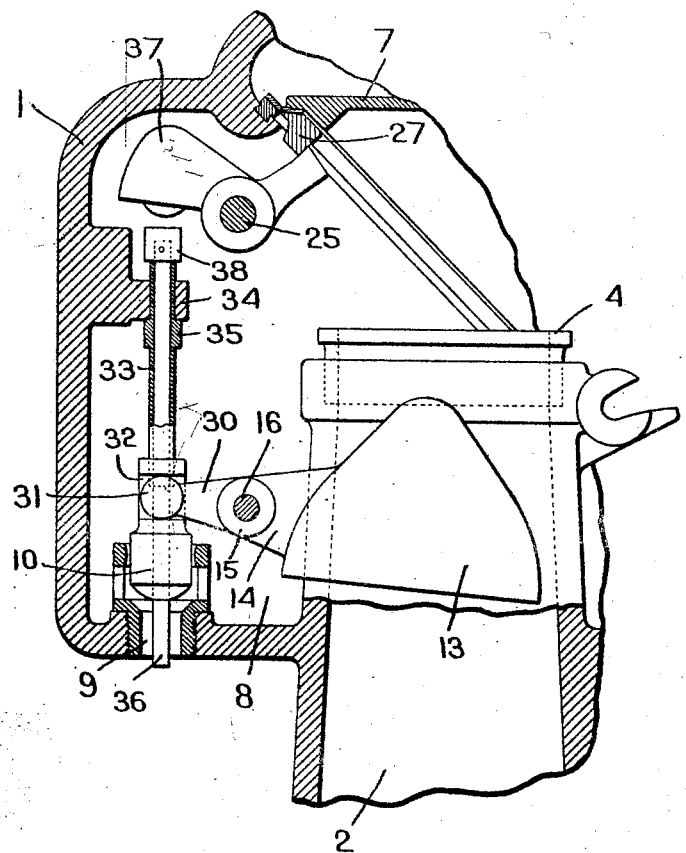
Fig. 4 is a fragmentary sectional view showing a different embodiment of the invention.

While my invention may be embodied in dry pipe valves of different construction yet for the sake of illustrating it I have chosen to show the invention as it might be employed in a dry pipe valve of the type illustrated and described in my Patent No. 1,450,428, dated April 3rd, 1923. This dry pipe valve comprises a casing 1 having an inlet 2 communicating with the water supply and terminating in a valve seat 3 on which is seated the water valve 4 that normally closes the inlet 2. The casing is also provided with an outlet 5 communicating with the sprinkler system, and with a valve seat 6 on which is seated the air valve 7 which is operatively connected to the water valve and is somewhat larger than the latter so that the air pressure in the system which is less than that of the water pressure maintains the valves closed. The casing is also provided with an intermediate chamber 8 between the water valve and the air valve, this chamber having communication with the atmosphere through a drip outlet 9 which is adapted to be closed by a drip valve 10.

11 indicates a funnel situated beneath the drip valve and leading to a waste pipe 12, the purpose of which is to catch the drip from the neutral chamber 8 and convey it to a drain.

The parts thus far described, with the exception of the particular form of drip valve, may be all as shown in my said Patent No. 1,450,428 and forms no part of the present invention.

In the present structure the drip valve is controlled by a buoyant element which is operatively connected to the drip valve and has sufficient weight to hold the drip valve open when said buoyant element is not buoyed up by water in the neutral chamber, but when said member is buoyed up by water in the neutral chamber then it becomes inoperative to hold the drip valve open and the latter is allowed to close.

This buoyant element is indicated at 13. and it may have any suitable construction adapted for the purpose. Merely as illustrating one type of buoyant element I have shown an element having a bell-shape, so that when water accumulates in the neutral chamber the air which is trapped in the bell-shaped member 13 will render the latter buoyant and cause it to rise with the water. This buoyant element is shown as carried by an arm 14 which is rigid with a sleeve 15 that is loosely mounted on a rod 16 extending transversely across the neutral chamber 8 and supported at its ends in bosses 17 formed on the casing 1. The drip valve 10 is shown as pivotally connected to an arm 18 rigid with another sleeve 19 also loosely mounted on the rod 16. The sleeve 15 is provided with a projection or finger 20 adapted to engage the laterally-extending end 21 of a finger 22 that is rigid with the sleeve 19.

The construction of the parts is such that when the buoyant member 13 is in its lowered position shown in Fig. 1, in which position it rests against and is supported by a stop 23, the finger 20 has engagement with the extension 21 and the finger 22, and the weight of the buoyant member is such relative to that of the drip valve that said buoyant member overbalances the weight of the drip valve and thus holds the latter open.

If, however, the water valve 4 should be opened from any cause, so as to allow water to flow into and accumulate in the neutral chamber 8 then the buoyant member 13 will be buoyed up by the water and will be raised into the position shown in Fig. 3. When it is buoyed up or raised said buoyant member becomes inoperative to hold the drip valve open and the latter is allowed to close as shown in Fig. 3.

24 indicates a gravity latch pivoted to the casing at 25 and having for its purpose to prevent the air valve from reseating after it has once lifted from its seat. So long as the air valve is properly seated the nose 26 of the latch rests against the portion 27 of the air valve and the latch is inoperative. If, however, the air valve is raised sufficiently from any cause to clear the portion 27 from the nose of the latch, then said latch will drop by gravity into its operative position shown in Fig. 3 thereby bringing the nose 26 beneath the portion 27 and preventing the air valve from reseating again. When in this position the latch is supported by a stop 28.

When it is desired to reseat the dry pipe valve after it has been tripped it is necessary to swing the latch into the position shown in Fig. 1 in order to allow the air valve to be properly seated. Although the latch and the drip valve are entirely independent from each other and operate independently, yet I have provided herein means whereby the latch may be carried into its inoperative position by means associated with the drip valve. For this purpose in Figs. 1 and 3 the drip valve is provided with an extension 29, situated beneath the weighted end of the latch so that if the drip valve is raised by means of an implement introduced into the drip opening the extension 29 will engage the weighted end of the latch and carry the latter into a position to permit the air valve to close. This upward movement of the drip valve is permitted because of the character of the connections between the buoyant member and said drip valve, said upward movement of the drip valve merely swinging the arm 22 away from the arm 20.

In Fig. 4 I have illustrated a slightly different embodiment of the invention. In this construction the buoyant member 13 is pivotally mounted on the rod 16 and is provided with a forked arm 30 which is rigid therewith, the ends 31 of the arms of the fork being circular and being received in recesses 32 formed in the drip valve. The drip valve has a sleeve 33 rigid therewith, the upper end of which operates in a guide 34 formed on the casing 1, said sleeve having a collar 35 thereon which limits the upward movement of the valve and the downward movement of the buoyant member. When the buoyant member is raised the drip valve will be positively closed as will be obvious.

In this embodiment the drip valve has a rod 36 extending axially therethrough, the upper end of which is situated beneath the weighted end of the latch 37. This rod is provided with a collar 38 at its upper end which engages the sleeve 33 and retains the rod in position. This rod is for the purpose of bringing the latch into its inoperative position when it is desired to reseat the valve. By pressing upwardly on the lower end of the rod the latter will slide through the drip valve and engage the latch 37 thereby swinging it into position to clear the projection 27 of the air valve so as to allow the air valve to be properly seated.

An advantage resulting from the structure herein described is that the drip valve will be closed as soon as there is a sufficient accumulation of water in the neutral chamber to raise the buoyant member even though there is insufficient pressure in the neutral chamber to unseat the air valve. As soon as the drip valve has thus been closed then the pressure will build up quickly in the neutral chamber and thus reduce the time necessary to unseat the air valve. With my invention, therefore, the air valve will be unseated more rapidly and in less period of time than with the prior constructions where the closing of the drip valve occurs only after the air valve has opened.

I claim.

1. A dry pipe valve comprising a casing, an air valve and a water valve therein with valve seats therefor, the space between said valves constituting a neutral chamber, an automatically-closing drip valve for the neutral chamber, and means independent from the air valve for holding the drip valve open, said means becoming inoperative for this purpose when there is an accumulation of water in the neutral chamber, whereby the drip valve will automatically close.

2. A dry pipe valve comprising a casing, an air valve and a water valve with valve seats therefor, said casing having a neutral chamber between said valves, a drip valve for said chamber tending to close by its own weight, and a buoyant member situated in the chamber and so connected to the drip valve that the weight of the buoyant member, when not buoyed up by water, holds the drip valve open, said drip valve closing automatically when the buoyant member is raised by an accumulation of water in the neutral chamber.

3. In a dry pipe valve for a sprinkler system, the combination with a casing having an inlet and a discharge opening, the latter communicating with said system, of a water valve to close the inlet, an air valve subjected to the air pressure in the system and functioning to hold the water valve closed, said casing having a neutral chamber between the valves, which chamber is provided with a drip port, a drip valve for closing said port, said valve tending to close by its own weight, and a buoyant member in said chamber operating to hold the drip valve open normally and when not buoyed up by water, said buoyant member becoming inoperative for this purpose when buoyed up by water whereby the drip valve will close.

4. In a dry pipe valve, the combination with a casing having an inlet and a discharge passage, the latter communicating with the system, of a water valve to close the inlet, an air valve subjected to air pressure in the system and functioning to hold the water valve closed, said casing having a neutral chamber between the valves, which chamber is provided with a drip port, a drip valve for closing said port, said valve tending to seat under its own weight, and a buoyant member in said chamber operatively connected to the drip valve and adapted by its weight and when not buoyed up by water in said chamber to hold the drip valve open, said buoyant member becoming inoperative for this purpose when buoyed up by water.

5. In a dry pipe valve, the combination with a casing, of an air valve and a water valve therein with seats therefor, said casing having a neutral chamber between said valves, a gravity latch to prevent the air valve from reseating when it has lifted from its seat, said latch being held in inoperative position by the seated air valve, said neutral chamber having a drip port, a drip valve therefor, means independent from said latch and air valve for holding the drip valve open and providing for closing it when there is an accumulation of water in the neutral chamber, and means associated with the drip valve to reset the latch.

6. In a dry pipe valve, the combination with a casing having an inlet and a discharge passage, the latter communicating with the system, of a water-valve to close the inlet, an air valve subjected to air pressure in the system and functioning to hold the water valve closed, said casing having a neutral chamber between the valves, which chamber is provided with a drip port, a drip valve for closing said port, a buoyant member in said chamber for controlling the drip valve, a latch to hold the air valve open when it is lifted from its seat, said latch being separate from and independent of the drip valve, and means associated with the drip valve for resetting the latch.

In testimony whereof, I have signed my name to this specification.

EZRA E. CLARK.